Figure 1:
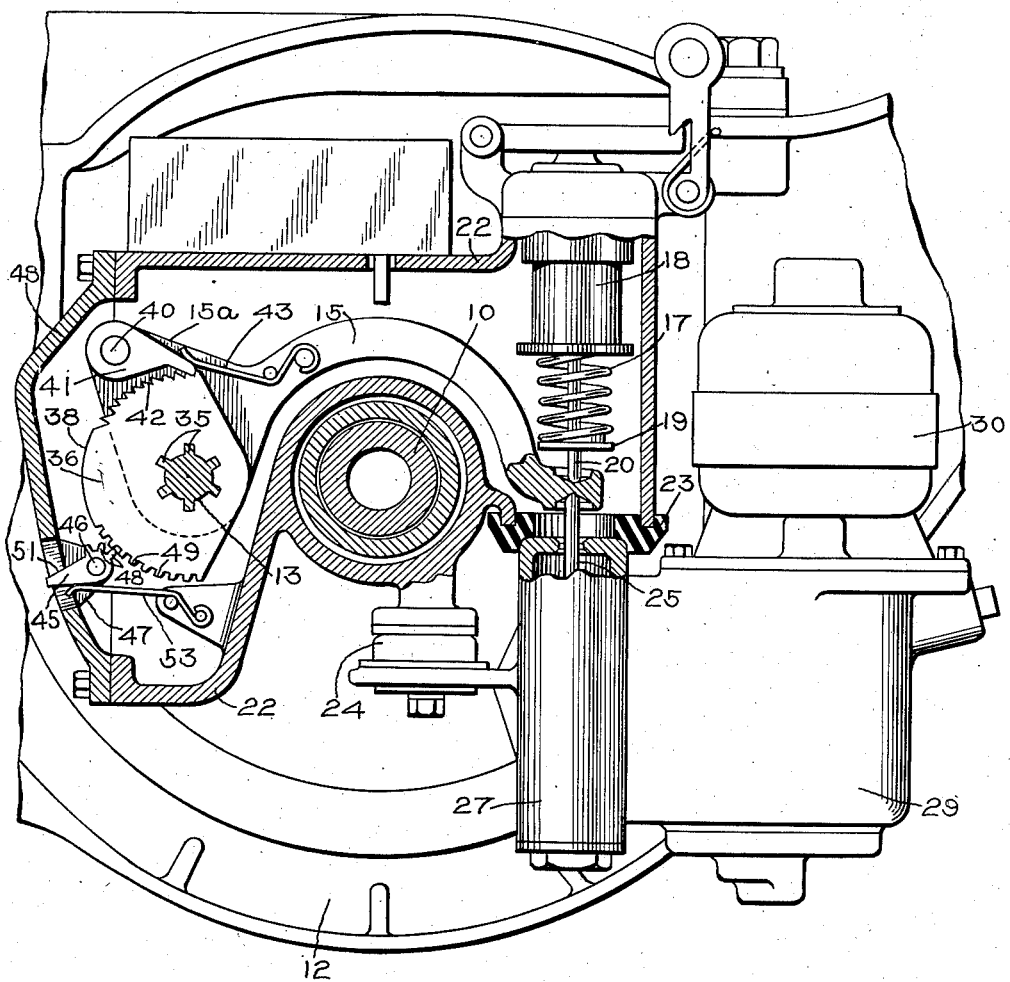

May 22, 1945.  C. S. KELLEY  2,376,489
SLACK ADJUSTER
Filed June 25, 1942   2 Sheets-Sheet 1

INVENTOR
Cecil S. Kelley
BY
ATTORNEY

May 22, 1945.    C. S. KELLEY    2,376,489
SLACK ADJUSTER
Filed June 25, 1942    2 Sheets-Sheet 2
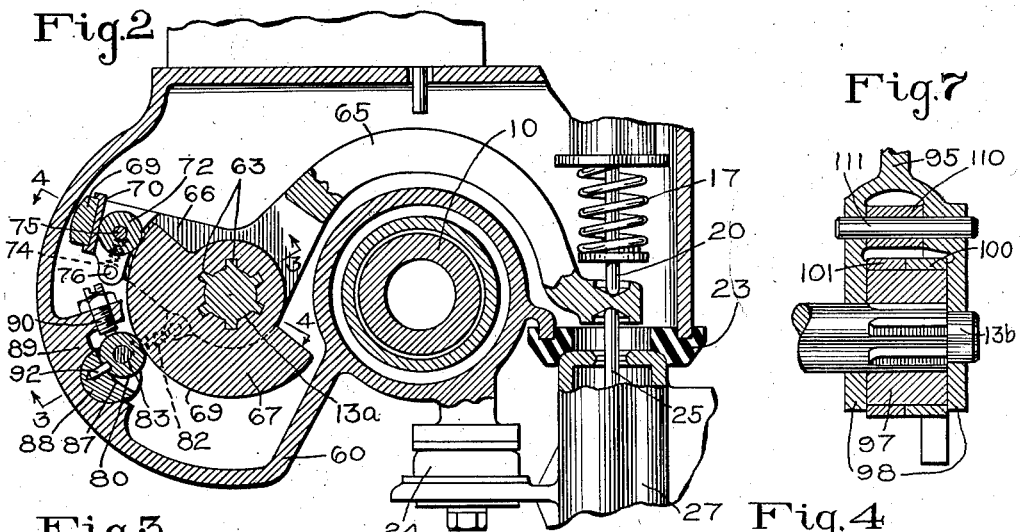
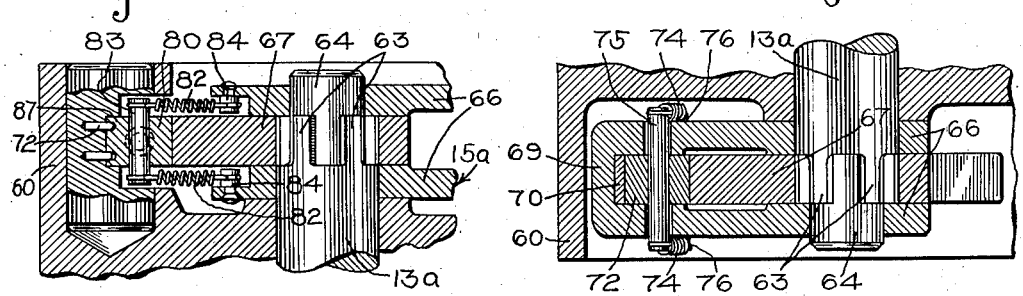
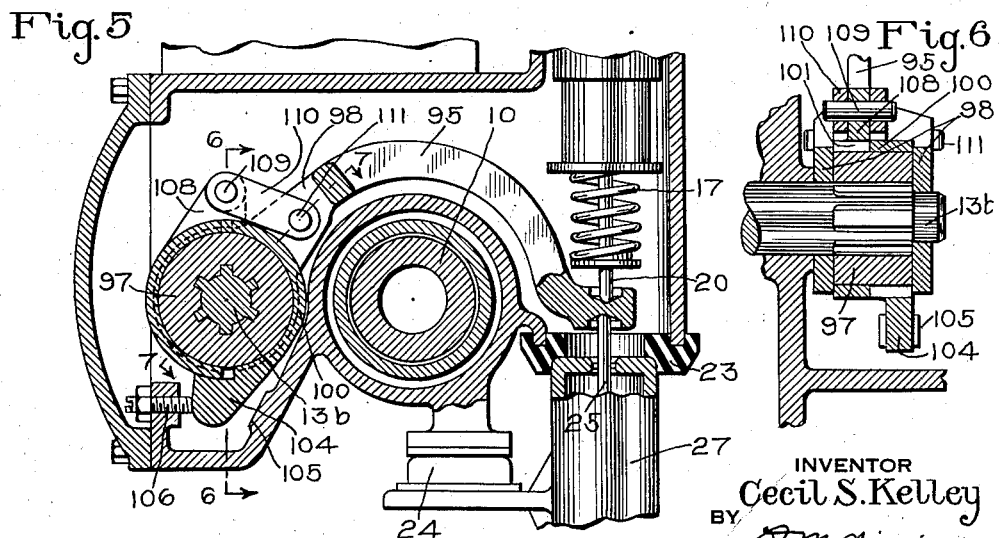
INVENTOR
Cecil S. Kelley
BY
ATTORNEY Patented May 22, 1945

2,376,489

UNITED STATES PATENT OFFICE 2,376,489

SLACK ADJUSTER

Cecil S. Kelley, Forest Hills, Pa., assignor to The Westinghouse Air Brake Company, Wilmerding, Pa., a corporation of Pennsylvania Application June 25, 1942, Serial No. 448,356

2 Claims. (Cl. 188—196)

This invention relates to automatic brake apparatus, and more particularly to slack adjuster means cooperative with the brake actuating elements of such apparatus to compensate for wear.

In the copending patent application of Arthur G. Larson, Patent No. 2,339,415, issued January 18, 1944, there is disclosed a compact braking mechanism for vehicle drive shaft, comprising a rotary brake operating element or cam shaft, an arcuate lever straddling the vehicle drive shaft and operable for actuating the operating element, a brake application spring cooperative with the lever to apply braking force, and hydraulic pressure means also cooperative with the lever for effecting the release of the brakes. As is the case with all types of braking apparatus, the friction elements or brake shoes employed in a mechanism of the type just referred to are subject to wear, which gradually increases the slack or lost motion that must be overcome during operation of the various actuating members of the assembly. The provision of some form of automatic slack take-up means to compensate such a brake mechanism for wear is thus desirable, but the structural features of the slack adjuster means must necessarily be carefully devised because of the limitations of the space available.

The principal object of my invention is to provide an improved automatic slack adjuster mechanism of compact and relatively simple construction, which may readily be made part of a braking apparatus of the class described without unduly increasing the bulk of the assembly or interfering with the normal operation of the associated elements.

Other objects and advantages of the invention will appear in the following more detailed description, taken in connection with the accompanying drawings, in which Fig. 1 is an elevational view, partly in section, of a spring applied, hydraulically released brake apparatus provided with a slack adjuster mechanism constructed in accordance with the invention;

Fig. 2 is a fragmentary sectional view of the same type of brake apparatus embodying a different form of my invention;

Figs. 3 and 4 are enlarged detail sectional views taken respectively along the lines 3—3 and 4—4 of Fig. 2;

Fig. 5 is a fragmentary sectional view of a similar brake apparatus having associated therewith a slacker adjuster embodying still another form of the invention; and Figs. 6 and 7 are sectional views taken along the lines 6—6 and 7—7, respectively, of Fig. 5.

*Embodiment shown in Fig. 1*

Referring to Fig. 1 of the drawings, the slack adjuster apparatus therein illustrated is designed for association with the brake equipment disclosed in the patent application, supra. It will be understood that this brake equipment is constructed and arranged to effect application of braking force to the wheels of the vehicle through the medium of a drive shaft 10, which is operatively connected to the wheels by means of suitable gears and is also provided with a brake drum and internal expansion brake shoe assembly of suitable construction, not illustrated in the drawings. Since the brake equipment, as such, is beyond the scope of the present invention, only such elements of the drive shaft braking apparatus as are necessary for disclosure of my improved slack adjuster mechanism are shown in Fig. 1. This braking apparatus includes a casing structure 12, which is suitably mounted on the vehicle in association with the rotary drive shaft 10; and which encloses a rotary brake drum secured to the drive shaft and brake shoe elements (not shown) cooperative therewith, in response to rotation of a brake operating cam shaft 13. It will be understood that the brake shoes are adapted to be moved into braking engagement with the brake drum upon clockwise rotation of the cam shaft 13, and are constructed and arranged to be withdrawn to release position during counterclockwise rotation of a shaft.

The brake apparatus further comprises means for operating the cam shaft 13 including an arcuate lever 15 having one end rotatably mounted on the cam shaft and the other or free end disposed at the side of the drive shaft 10 opposite the cam shaft. For actuating the lever 15 to effect application of the brakes there is provided a heavy coil spring 17, one end of which is mounted in a spring guide element 18 secured to the casing structure and the other end of which bears against a collar 19 carried by a plunger 20 engaging the free end of the lever. The spring 17 is operative when expanding to cause operation of the lever in a clockwise direction with respect to the cam shaft 13, as shown in Fig. 1. It will be noted that the several elements just described, including the brake application spring 17, the lever 15 and the cam shaft 13, are all disposed within a casing structure 22, which is preferably supported by the main casing structure 12 through the medium of rubber shock absorbing elements such as those indicated at 23 and 24.

Hydraulic means is provided for moving the lever 15 and the associated brake elements to their release positions in opposition to the force exerted by the spring 17, and may comprise a plunger 25 having an upper end disposed in engagement with the free end of the lever 15 just below the adjacent end of the spring-pressed plunger 20, the plunger 25 being constructed and arranged for operation by a suitable piston, not shown, which is mounted within a cylinder 27 forming part of the casing structure. The other elements of the hydraulic means operable to cause upward movement of the plunger 25 may include a pump 29 and driving motor 30 therefor, which may be of any suitable construction such as that disclosed in the aforementioned patent application, and need not be described in detail. It will be understood that when it is desired to effect a release of the brakes, the motor 30 is energized for driving the liquid pump 29 and thereby increasing the pressure of fluid contained in the cylinder 27, the fluid pressure being effective to move the plunger 25 and adjacent end of the lever upwardly against the force of the spring 17.

According to the invention as disclosed in Fig. 1, the end of the cam shaft 13 outwardly of the portion on which the lever 15 is journaled is provided with a plurality of longitudinally arranged ribs 35. A rotary member or lock element 36 is mounted on this end of the cam shaft, and has formed therein a suitably slotted opening adapted to receive the ribbed end of the shaft so that the two elements are securely locked together.

The rotary member 36 may be substantially semi-circular in form, with the opening for receiving the cam shaft 13 disposed centrally of the arcuate surface 38 of the rotary member. Carried on an extension 15a of the lever 15 is a pin 40, which is disposed outwardly of the curved surface 38 of the rotary member and has pivotally mounted thereon a pawl 41. A spring 43 is mounted on the lever 15 for holding the pawl 41 normally in engagement with a toothed portion 42 of the curved surface 38, the pawl 41 being so positioned with respect to the teeth formed on the rotary member as to transmit braking force thereto when the spring 17 is rendered effective to apply the brakes, as hereinafter explained. The pawl 41 is on the other hand yieldable to permit release movement of the lever 15 relative to the rotary member 36 when the latter element is held stationary.

For measuring the angle through which the cam shaft 13 and rotary member 36 are moved in effecting an application of the brakes and for limiting the extent of release movement thereof, there is provided a rotary pawl 45, which is pivotally mounted on a pin 46 carried by a lug 47 formed on a cover plate 48, which may be bolted or otherwise secured to the casing structure 22. The pawl 45 has a plurality of teeth disposed concentrically of the pin 45 and engageable with similar teeth 49 formed on an extension of the curved surface 38 of the rotary member 36. Formed adjacent the teeth 48 is a relatively flat surface 51, which is engageable with the curved surface 38 of the rotary member 36 when the pawl 45 is turned in a clockwise direction during release movement of the rotary member 36 and other elements of the brake equipment. As will hereinafter be explained, the various elements are illustrated in a brake application position, wherein counterclockwise movement of the pawl 45 is resisted by a spring 53 secured to the casing structure 22.

With the brake apparatus in application position as shown in Fig. 1, the fluid pressure normally maintained on the piston and piston rod 25 by means of the motor driven pump 29 may be considered as having been withdrawn as a result of a brake applying operation of the associated control apparatus, not disclosed in the present specification. With the spring 17 thus rendered operative to exert braking force against the free end of the lever 15, that element is caused to transmit corresponding torque through the medium of the pawl 41 to the rotary member 36 and cam shaft 13, thereby effecting application of the brakes contained within the housing 12.

When it is desired to effect the release of the brakes, the motor 30 is energized to drive the pump 29, and the resultant increase in fluid pressure acting on the piston associated with the piston rod 25 causes it to move the lever 15 in opposition to the force of the spring 17, the lever being thereby turned in a counterclockwise direction with respect to the axis of the cam shaft 13. It will be understood that suitable release springs are associated with the brake shoe mechanism housed within the casing 12, so that as the brake applying force is withdrawn from the cam shaft 13 as just explained, these springs in effecting release movement of the associated brake shoe elements also cause counterclockwise rotation of the cam shaft and the attached rotary member 36, the release movement of these elements and of the lever 15 being simultaneous. As the rotary member 36 is thus turned in a counterclockwise direction toward release position, the rotary pawl 45 is turned in a clockwise direction about the pin 46. Assuming that no slack or lost motion between the braking elements contained within the housing 12 had to be overcome in effecting the application of the brakes just described, when full release movement of the rotary member 36 and the associated elements is completed, the pawl 45 should be so positioned that the surface 51 thereof will lie closely adjacent or bear slightly against the curved surface 38 of the rotary member.

After wear of the brake shoes and other elements contained in the housing 12 has increased the distance through which such elements must be moved in effecting application of braking force to the drive shaft 10, subsequent operation of the spring 17 in effecting an application of the brakes will carry the lever 15, pawl 41, rotary member 36 and cam shaft 13 in a clockwise direction to a braking position beyond that normally assumed by the elements. When the rotary member 36 is thus turned beyond the normal angle for producing an application of the brakes, the rotary pawl 45 is forced in a counterclockwise direction beyond the position in which it is shown in Fig. 1, until one of the teeth 49 of the rotary member has been carried over the last in line of the teeth 48 formed on the pawl. The spring 53 meanwhile continues to urge the pawl 45 in a clockwise direction, so that after displacement of the rotary member 36 with respect to the pawl, the teeth 48 will nevertheless remain in meshing relation with the teeth 49.

During the next release operation of the brake mechanism, upward movement of the fluid pressure actuated piston rod 25 against the opposing force of the spring 17 causes the usual turning of the lever 15 in a counterclockwise direction with respect to the axis of the cam shaft 13, which is rotated in the same direction while the brake elements within the housing 12 are moved to release position as hereinbefore explained. Since the teeth 49 have been displaced with respect to the teeth 48 of the rotary pawl 45, however, movement of the pawl 45 in a clockwise direction into its locked position wherein the surface 51 thereof engages the surface 38 of the rotary member 36 will occur before the lever 15 has been moved to its full release position by operation of the piston rod 25 and associated elements. Consequently, the rotary member 36 and cam shaft 13 are locked against further movement while the lever 15 continues moving toward its usual release position. During such movement of the lever 15 relative to the locked rotary member 36, the pawl 41 slides over one or more of the teeth 42, so that the new position of the lever 15 with respect to the rotary member 36 will be maintained during the following application of the brakes.

It will be apparent that the locking of the lever 15 in the new position with respect to the rotary member 36 and brake cam shaft 13 will be effective to compensate for any slack or lost motion previously developed, so that the desired efficiency and uniformity of operating characteristics of the brake mechanism, with respect to other units associated therewith, are thus automatically maintained.

*Embodiment shown in Fig. 2*

Illustrated in Fig. 2 of the drawings is a brake mechanism similar to that shown in Fig. 1 but embodying slack adjuster means constructed in accordance with a somewhat different form of the invention.

The general characteristics of the brake mechanism shown in Fig. 2 will be understood from the description already presented in connection with Fig. 1, it being known that suitable brake shoe elements, not shown, are provided for applying braking force to the drive shaft 10 in accordance with operation of a rotary cam shaft 13a through the medium of an an arcuate lever 65 which is movable toward brake application position by spring 17, or toward brake release position by the usual fluid pressure release means including the piston rod 25. The brake mechanism including the slack adjuster means shown in Fig. 2 is contained within a casing structure 60 which is supported through the medium of the rubber mounting elements 23 and 24.

As may be seen in Figs. 3 and 4, the cam shaft 13a is provided with a plurality of longitudinal ribs 63 and terminates in a reduced portion 64. The end of the lever 65 associated with the cam shaft is bifurcated to form a pair of spaced portions 66 that are adapted to straddle a semi-circular rotary member 67, which is adapted to serve a purpose similar to that of rotary member 36 shown in Fig. 1. The spaced portions 66 of the lever 65 are provided with suitable bores conforming to the cam shaft 13a and the reduced portion 64 thereof, on which the lever is journaled, while the rotary member 67 has a grooved aperture fitting the cam shaft and ribs 63, and is thus adapted to be secured against rotation relative to the cam shaft. As is best shown in Fig. 2, the semi-circular rotary member 67 has formed thereon a curved bearing surface 69 which is disposed concentrically of the axis of the cam shaft 13a.

The spaced portions 66 of the arcuate lever 65 are joined by a transverse end portion 69 which may be fitted with a bearing element 70, as shown in Figs. 2 and 4. Interposed between the bearing element 70 and the curved surface 69 of the member 67 is a lock roller 72, which is yieldingly wedged in interlocking relation with the two elements by the force of a pair of tension springs 74, each of which has one end secured to a pin 75 upon which the roller is journaled, and its other end secured to one of a pair of lugs 76 carried on the spaced portions 66. As is best shown in Fig. 2, the bearing element 70 is canted with respect to the surface 69 of the rotary member 67, and is so spaced therefrom as to prevent the roller 72 from being pulled downwardly beyond a normal position, as illustrated in Fig. 2, under the force of the spring 74, although the roller is free for movement in the opposite direction against the force of the spring. The roller 72 thus serves as a locking wedge adapted for locking engagement with the bearing element 70 and the curved surface 69 of the rotary member 67 upon movement of the lever 65 in a clockwise direction, as viewed in Fig. 2.

Another lock roller 80 is provided for limiting movement of the rotary member 67 in a manner hereinafter explained, and is held in operative relation with the curved surface 69 through the medium of a pair of tension springs 82, each of which is secured to one end of a pin 83 carried by the roller and to a lug 84 mounted on the adjacent portion 66 of the roller 65, as shown in Fig. 3. The lock roller 80 is disposed in rolling engagement with a bearing surface 87 formed in a plug element 88, which is firmly anchored in a suitable depression formed in an enlarged portion 89 of the casing wall. The bearing surface 87 of the plug element is canted with respect to the adjacent portion of the curved surface 69 of the rotary element 67, the two surfaces being so spaced apart as to prevent the roller 80 from being moved downwardly beyond a normal or locking position as illustrated, although the roller is free to move upwardly toward a stop member 90, which is adjustably mounted in a suitable lug extending from the casing portion 89. To prevent the roller 80 from sliding on the surface 87, a pair of pins 92 are inserted in the plug element 88 and are adapted to extend into suitable apertures formed in the adjacent portion of the roller.

In Fig. 2 of the drawings, the various operating elements of the brake mechanism are illustrated in a brake applying position. The elements are moved to this position in the usual manner upon release of fluid under pressure from the cylinder 27 to allow expansion of the brake application spring 17, as hereinbefore explained, so that the spring is rendered operative to move the lever 65 downwardly or in a clockwise direction with respect to the axis of the shaft 13a. Through the medium of the lock roller 72 the lever 65 thus forces the rotary member 67 and the connected cam shaft 13a in a clockwise direction to effect application of the brakes.

When the rotary member 67 is thus operated to turn the cam shaft 13a in a clockwise direction in effecting an application of the brakes, the lock roller 80 engaging the curved surface 69 of the rotary member is rolled upwardly toward the stop element 90, which is set in a predetermined position for limiting such movement of the lock roller at a point corresponding with application of the associated brake shoes, not shown, with maximum braking force, and with maximum allowable slack movement or lost motion. As already pointed out, the elements of the brake mechanism shown in Fig. 2 are positioned in braking position, it being observed that the lock roller 80 is held substantially in engagement with the stop element 90.

To effect a release of the brakes, hydraulic force is applied in the usual manner through the medium of the piston rod 25 to overcome the pressure of spring 17 and to raise the lever 65, which is thereby turned in a counterclockwise direction with respect to the axis of the cam shaft 13a. The usual release springs associated with the brake shoes are then permitted to shift those elements, together with the cam shaft 13a and rotary member 67, toward release position, while the lock roller 80 is at the same time rolled away from the stop element 90. It will be understood that under normal conditions when slack movement of the brake elements has not been excessive, both the brake lever 65 and the rotary member 67 are brought to their full release positions at substantially the same time and before the roller 80 has traveled far enough to become tightly wedged between the bearing surface 87 and the curved surface 69.

If excessive slack subsequently develops in the brake assembly, so that in effecting an application of the brakes the lever 65, rotary member 67, and cam shaft 13a are forced clockwise beyond the normal braking position in which they are illustrated in Fig. 2, the lock roller 80 is then stopped upon engagement with the stop element 90, while the curved surface 69 of the still moving rotary member is slipped under the roller until the desired braking force is brought to bear against the shaft 10. It will readily be apparent that the amount of relative displacement of the rotary member 67 with respect to the roller 80 is a measure of the slack existing within the brake assembly.

By reason of the new position of the roller 80 on the surface 69 of the rotary member, when the various elements of the braking assembly are caused to move toward release position, the counterclockwise rotation of the rotary member 67 will effect wedging of the lock roller 80 between the surfaces 87 and 69, as hereinbefore explained, prior to complete movement of the lever 65 to the normal full release position. With the rotary member 67 thus locked against further counterclockwise rotation, the lever 65 and lock roller 72 are then shifted with respect to the rotary member 67, thereby compensating for the slack.

Embodiment shown in Fig. 5

Referring to Fig. 5 of the drawings, the braking assembly therein disclosed includes an arcuate brake lever 95, which like the brake levers 15 and 65 hereinbefore described is arranged to control operation of a cam shaft associated with the usual brake shoes, not shown, the cam shaft being in this case designated at 13b. The end of the brake lever 95 opposite that journaled on the cam shaft is interposed between the plunger 20 controlled by the brake application spring 17, and the piston rod 25 associated with the hydraulic cylinder 21.

Secured to a ribbed portion of the cam shaft 13b is a rotary member or disk 97, which, as shown in Figs. 6 and 7, is interposed between spaced legs 98 of the bifurcated end of the lever 95, which legs are suitably apertured for receiving corresponding inner and outer bearing portions of the cam shaft, on which the lever is journaled.

For controlling cooperation between the lever 95 and the rotary disk 97, a pair of friction ring elements 100 and 101 are mounted on the disk, and are disposed in concentric, side by side relation as best shown in Figs. 6 and 7.

The friction ring element 100 comprises an annular contractile portion surrounding and releasably gripping the disk 97 and terminating in an enlarged lug portion 104 which partially overlaps the end of the contractile portion, as shown in Fig. 5. The lug portion 104 is interposed between a stationary stop lug 105 and an adjustable stop bolt 106 carried by the casing structure of the brake assembly. The lock ring element 100 is so disposed on the rotary disk 97 as to check counterclockwise rotation thereof after the lug portion 104 has been brought into engagement with the stop lug 105, due to the binding effect of the contractile portion on the peripheral surface of the disk. The friction ring element 100 is on the other hand adapted to release its grip on the rotary disk 97 upon clockwise movement thereof causing engagement of the lug portion 104 with the stop bolt 106, as disclosed in Fig. 5.

The other friction ring element 101 is similar to that just described, and includes a contractile portion fitted about and releasably gripping the peripheral surface of the rotary disk 97, and a lug portion 108, which partially overlaps the free end of the contractile portion which end is diametrically opposite the free end of ring element 100. The lug 108 is pivotally connected by means of a pivot pin 109 to the brake lever 95 through the medium of a bifurcated link 110, the forked end of which is journaled on the pin 109 and the opposite end of which is journaled on a pin 111 carried by the lever 95. It will thus be seen that the friction ring element 101 is constructed and arranged for contraction to grasp the rotary disk 97 upon clockwise movement of the lever 95 in effecting an application of the brakes, but is adapted to become expanded and to slip over the disk when the lever 95 is moved toward release position.

In principle, the operation of the slack adjuster elements of the brake assembly shown in Fig. 5 is similar to the operation of the mechanism shown in Fig. 2. When it is desired to effect an application of the brakes, the associated brake control means is operated in the usual manner to withdraw hydraulic pressure normally transmitted by way of the piston stem 25 to the brake lever 95, so that the brake spring 17 is rendered effective to force the adjacent end of the lever downwardly, as viewed in Fig. 5. In so moving, the lever 95 exerts a pulling force through the medium of the link 110 and pin 109 on the lug portion 108 of the friction ring element 101, which is thereby tightened into gripping relation with the rotary disk 97 for turning the latter and the connected cam shaft 13b in a clockwise direction, thereby causing application of the associated brake elements.

Under normal conditions the lug portion 104 of the other friction ring element 100 is brought closely adjacent the stop bolt 106 when the braking force is a maximum. So long as excessive slack movement between the operating elements of the brake assembly is not developed, the relative position of the friction spring 100 on the rotary disk 97 thus remains unchanged. It will be understood that when the brakes are released, the resultant counterclockwise rotation of the cam shaft 13b, rotary disk 97 and friction ring element 100 will bring the lug portion 104 into light contact with the lug portion 105 carried by the casing structure, at approximately the moment the other elements including the brake lever 95 are stopped in full release position.

When an application of the brakes is effected after the development of slack or lost motion in the brake assembly, however, after movement of the lug portion 104 of the friction ring element 100 into engagement with the stop bolt 106, as shown in Fig. 5, the further rotation of the rotary disk 97 and cam shaft 13b necessary to effect application of the desired braking force results in a corresponding change in the relative position of the friction ring element 100 on the disk, since the friction ring is at such times caused to relax its grip on the disk as hereinbefore explained. During the subsequent release operation, the lug portion 104 of the friction ring element 100 is carried into operative engagement with the lug portion 105 provided on the casing structure, before completion of movement of the lever 95 to full release position. The friction ring element 100 is thus rendered operative to check further counterclockwise movement of the rotary disk 97 and brake cam shaft 13b, while the brake lever 95 continues its release movement, acting through the medium of the link 110 and lug portion 108 to cause the other friction ring element 101 to slip into a new position with respect to the rotary disk.

Each of the three different forms of the invention, as embodied in the brake equipments disclosed in the foregoing description, is thus constructed and arranged to effect automatic take-up of lost motion before slack movement develops sufficiently to impair the efficiency of the brakes, and although of sturdy construction, is designed to fit within the small space available in a brake assembly of the spring applied, fluid released type illustrated.

Having now described my invention, what I claim as new and desire to secure by Letters Patent, is:

1. A slack adjuster mechanism for a brake assembly of the type including a cam shaft normally rotatable through a certain angle for effecting application and release of the brakes and an actuating lever cooperable with said cam shaft, in combination, a disk member secured concentrically on said cam shaft, a pair of contractile locking ring elements fitted on said disk member, means operatively connecting one of said locking ring elements to said lever for transmitting brake application force from said lever to said disk member, and means cooperative with the other locking ring element, following undesired rotation of said cam shaft beyond said certain angle in effecting an application of the brakes, for checking release rotation of said disk member and cam shaft at a predetermined point before said actuating lever has reached its release position.

2. In a slack adjuster mechanism for a brake device having a cam shaft normally rotatable through a certain angle in effecting application and release of the brake, and a lever pivotally connected to said cam shaft and constructed and arranged to actuate same, the combination of a rotary disk member secured to said shaft adjacent said lever and adapted for rotation with said shaft, a contractile clutch element mounted on said disk member, means connecting said clutch element to said lever whereby brake application movement thereof flexes said clutch element into gripping relation with said disk member for turning said shaft with the lever, a contractile locking element having a projecting lug portion and adapted to be flexed into gripping relation with said disk member in a reverse direction with respect to said clutch element, a stationary stop member disposed for cooperation with said lug portion of the locking element for limiting rotation of the cam shaft during movement of said lever in releasing the brake, and an adjustable stop member cooperative with said lug portion for causing said locking element to expand and slip on said disk member, in the event of excessive rotation of said cam shaft beyond said certain angle in applying the brake, whereby upon subsequent return movement of said cam shaft to release the brake said associated elements will have been automatically adjusted to take up slack motion in said brake device.

CECIL S. KELLEY.